United States Patent Office 3,840,545
Patented Oct. 8, 1974

3,840,545
POLYHYDRO ISOQUINOLINES
Bernard B. Brown, Westfield, Ronald Harmetz, Randolph Township, and Donald Ruopp, Belleville, N.J., assignors to CPC International Inc.
No Drawing. Filed Aug. 18, 1971, Ser. No. 172,915
Int. Cl. C07d 35/06
U.S. Cl. 260—289 R          19 Claims

ABSTRACT OF THE DISCLOSURE

A process for the preparation of 1-substituted-2-alkyl polyhydroisoquinolines. These compounds are useful as intermediates in the preparation of substituted morphinans such as dextromethorphan.

---

This invention relates to a process for the preparation of 1-substituted-2-alkyl polyhydroisoquinolines. It relates in particular to a novel method of rearranging quaternary N-benzyl isoquinolinium salts whereby the benzyl group migrates from the nitrogen atom to the 1-position, i.e., a Stevens rearrangement. It relates also to a method for the conversion of 2-alkyl-1,2,3,4-tetrahydroisoquinoline to 2-alkyl-1,2,3,4,5,8-hexahydroisoquinolines.

The compounds prepared by the process of this invention are useful as intermediates in the preparation of antitussive materials. Antitussive materials act to relieve coughing. Cough is a useful physiological mechanism serving to clear the respiratory passages of foreign material and excessive secretions. It should not be suppressed indiscriminately. There are, however, many situations in which cough does not serve any useful purpose but may, instead, only annoy the patient or prevent rest and sleep. In such situations, a drug which reduces the frequency or intensity of the coughing is indicated. A number of such cough-suppressant drugs are available; most of them act centrally through mechanisms that are not entirely clear. They include many narcotic and analgesics, as well as a number of non-narcotic agents that have recently become available.

Significant considerations in the selection of a particular cough-suppressant agent include not only the antitussive efficacy against pathological cough, but also the incidence of side effects. Most non-narcotic agents now available as antitussives are effective against coughs introduced by a variety of experimental techniques, such as inhalation of irritant aerosols. Very few, however, are effective against pathological cough, so that resort frequently is had to the older narcotic cough-suppressant such as codeine, dihydrocodeinone, and dihydrocodeine.

Dextromethorphan is one non-narctic cough-suppressant which is effective against pathological cough and has no analgesic or addictive properties, and is accordingly a very desirable antitussive. Its effectiveness against pathological cough is about equal to that of codeine but, unlike codeine, it rarely produces drowsiness or gastrointestinal disturbances. Furthermore, its toxicity is quite low. Its method of preparation, however, is quite involved and expensive. Regardless of the method by which it is prepared, several steps are required and many of these steps result in low yields of a particular intermediate.

It is accordingly a principal object of the present invention to provide an improved more economical method for the preparation of dextromethorphan.

It is also an object of the present invention to provide a new method of carrying out the Stevens rearrangement.

It is also an object of the present invention to provide a method for the preparation of 1-substituted-2-alkyl polyhydroisoquinolines.

It is also an object of the present invention to provide a method for the migration of benzyl and substituted benzyl groups from the quaternized nitrogen of an isoquinolinium salt to the 1-position of the isoquinoline nucleus.

It is also an object of the present invention to provide a method for the conversion of 2-alkyl-1,2,3,4-tetrahydroisoquinolines to 2-alkyl-1,2,3,4,5,8-hexahydroisoquinolines.

These and other objects of the invention are accomplished by a process for the preparation of 1-substituted-2-alkyl polyhydroisoquinolines comprising reacting a substituted N-alkyl polyhydroisoquinolinium salt having the formula:

I

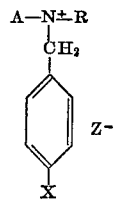

where R is lower alkyl, A, taken with N, is an octahydroisoquinoline, hexahydroisoquinoline or tetrahydroisoquinoline residue, Z is a halide or tosylate ion, and X is lower alkyl, lower alkoxy or hydrogen, with an alkali metal hydroxide, alcoholate, carbonate or bicarbonate. The term "lower," as used herein, indicates a carbon atom content of up to six carbon atoms. It will be noted that such reaction involves a migration of the benzyl group from the nitrogen atom of the polyhydroisoquinoline nucleus to the 1-carbon atom of that nucleus. This is known as the Stevens rearrangement which has in the past been effected by means of phenyl lithium, potassium hydroxide or potassium amide. The N-alkyl polyhydroisoquinolinium salt is obtained from an N-alkyl isoquinoline by a reduction method which includes the conversion of a 2-alkyl-1,2,3,4-tetrahydroisoquinoline to the 2-alkyl-1,2,3,4,5,8-hexahydroisoquinoline by means of sodium and liquid ammonia.

In a more particular sense, the invention relates to a process for the preparation of such 1-substituted-2-alkyl polyhydroisoquinolines wherein the substituted N-alkyl polyhydroisoquinolinium halide has the formula:

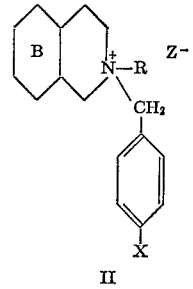

II where R is lower alkyl, the 6-membered ring B is tetrahydrobenzo, dihydrobenzo or benzo, Z is a halide or tosylate ion, and X is lower alkyl, lower alkoxy or hydrogen.

When B is tetrahydrobenzo and the only double bond is in the 9,10-position, the resulting 1-substituted-2-alkyl polyhydroisoquinoline may be converted to dextromethorphan by the method of Grewe, Angew. Chem. 59, 194 (1947); or Schnider and Grüssner, Helv. Chimb. Acta, 32, 821 (1949). The method involves a ring closure by means of phosphoric acid (which also causes demethylation of the methoxy group) followed by remethylation. If the 6-membered ring B in the above formula is dihydrobenzo and the two double bonds are in the 6,7 and 9,10-positions, then the corresponding substituted morphinans may be prepared from the Stevens rearrangement product by hydrogenation, followed by ring closure and remethylation as above. If the 6-membered ring B in the above formula is benzo, i.e., aromatic, then the rearrangement product may be converted to the corresponding substituted morphinans by reduction with an alkali metal, preferably sodium, and liquid ammonia, which converts both aromatic rings to quinoid structures, whereupon the quinoid ring which forms part of the hydroisoquinoline structure is hydrogenated, followed by aromatization of the other quinoid ring, and then ring closure and remethylation as above, yielding the desired substituted morphinan.

The Stevens rearrangement of tetrahydropyridinium salts is also known. Recent publication by Yokohama et al., J. Med. Chem., 13 488 (1970) and Block et al., J. Med. Chem., 12 845 (1969) show the use of powdered potassium hydroxide in toluene as a suitable environment for such a reaction. There is no suggestion, however, of the suitability of such environment for the Stevens rearrangement of polyhydroisoquinolinium salts, and Stevens rearrangement conditions are not known to be uniformly applicable to polyhydropyridinium salts and polyhydroisoquinolinium salts.

The particular Stevens rearrangement of this invention proceeds smoothly, with relatively good yields. In some instances, yields are of the order of 40–60%. This permits the overall synthesis of dextromethorphan, for example, at a considerable saving with respect to the cost of presently known processes for its preparation.

The lower alkyl R shown in formula I as indicated earlier, may be any alkyl radical having up to 6 carbon atoms. Methyl is preferred, because it is present in dextromethorphan, but ethyl, propyl, butyl and amyl radicals likewise are contemplated within the scope of the invention. The substituent X on the benzyl group likewise corresponds to the X of formula I and its scope is as indicated there.

Particularly preferred, for the purpose of preparing dextromethorphan is the use in the process of a p-methoxybenzyl isoquinolinium salt.

The basic reactant may as indicated be either an alkali metal hydroxide, alcoholate, carbonate or bicarbonate. Preferably, it is a sodium or potassium alcoholate. The use of such basic reactants not only is effective to provide increased yields but avoids the use of such hazardous (because of the danger of explosion) materials such as phenyl lithium which has been used in prior art processes. Illustrative basic reagents contemplated for use in this process include sodium hydroxide, potassium hydroxide, lithium hydroxide, sodium and potassium alcoholates of lower alcohols having up to 6 carbon atoms, including sodium methylate, sodium butylate, sodium tert-amylate, potassium methylate, potassium isopropoxylate, potassium tert-butoxide and potassium 2-ethylhexoate, sodium carbonate, potassium carbonate, lithium carbonate, potassium bicarbonate and sodium bicarbonate. The use of potassium tert-butoxide and sodium tert-amylate are preferred. Alkali metal amylates are particularly useful because they are more soluble in the solvents used in the process herein than are other readily available alcoholates.

Generally, the process is carried out in an inert solvent and at somewhat elevated temperatures. This requires that the solvent be relatively high boiling, i.e., so as to permit the reaction to be carried out at atmospheric pressure. The temperature should be maintained within a range of from about 50° C. to about 175° C., preferably from about 130° C. to about 170° C. Suitable inert solvents include hydrocarbons such as benzene, toluene, xylene, mesitylene, kerosene and the like; chlorinated hydrocarbons such as chlorobenzene, dichlorobenzene, and tetrachloroethylene; aliphatic amides such as tetramethylurea, hexamethylphosphoric amide and dimethylformamide; esters and ketones having up to and including 10 carbon atoms. As indicated, when the process is to be carried out at atmospheric pressure, it is preferred that the solvent have a boiling point greater than about 50° C. so as to permit the reaction to be carried out efficiently at the above temperature.

The process may be carried out simply by mixing the indicated reactants and heating the resulting mixture to the desired temperature. The time required for the reaction ranges from about 15 minutes up to about 10 hours, depending on the particular reactants employed and the quantities of such reactants and, to some extent, on the temperature at which the rearrangement is carried out. At the conclusion of the reaction, the desired product may be isolated from the product mixture by dilution with water and subsequent extraction with a suitable solvent such as heptane and the extract then washed with water. Evaporation of the solvent yields the desired rearrangement product which may be purified by chromatography, fractional distillation or conversion to a salt such as the oxalate.

The amount of basic reactant which is to be employed may vary although it is desirable to use one mole of such basic reagent per mole of the substituted N-alkyl polyhydroisoquinoline reactant. The process is nevertheless operable with lesser or greater amounts of basic reagent and it is ordinarily advantageous to use a slight stoichiometric excess.

The process is particularly effective, in certain instances, when it is carried out by first heating a mixture of the basic reagent and solvent and adding the substituted N-alkyl polyhydroisoquinolinium salt portionwise to such mixture, or, just the reverse, i.e., by heating the substituted N-alkyl polyhydroisoquinolinium salt, preferably in the solvent and adding to it the basic reagent. In either case, substantially all of the desired reaction takes place at a relatively high temperature, i.e., from about 130° C. to about 170° C. This particular method results in increased yields and is, therefore, a particularly preferred method.

The process of this invention may be carried out using the particular polyhydroisoquinolinium halide as such, or that reactant may be freshly prepared and used as the product mixture, i.e., without the necessity of isolating and purifying it from its product mixture. Example 15 illustrates the latter method.

The invention is illustrated further and in more detail by the following examples which, however, are not to be taken as limiting. All parts are by weight unless otherwise expressly stated.

EXAMPLE 1

Preparation of 2-methyl-1,2,3,4-tetrahydroisoquinoline

A pressure reactor is charged with 72.5 parts (0.51 mole) of technical isoquinoline and 200 parts of distilled water. The system, after nitrogen purging, is pressurized to 40 p.s.i.g. with methyl chloride, agitated and heated to 80–85° C. After methyl chloride consumption ceases the solution is cooled and extracted with 18 parts of benzene. The aqueous phase is degassed in vacuo followed by hydrogenation at 50 p.s.i.g. using 5.0 parts of 5% platinum on carbon catalyst. When hydrogen consumption ceases the catalyst is removed by filtration, the filtrate is made basic and extracted with benzene. Distillation of the extract gives 70 parts (94% of the theory) of 2-methyl-1,2,3,4-tetrahydroisoquinoline, b.p. 112–113° C. (10 mm.).

EXAMPLE 2

Preparation of 2-methyl-1,2,3,4,5,8-hexahydroisoquinoline

To a solution of 12.7 parts (0.55 mole) of sodium in 120 parts of liquid ammonia contained in a pressure vessel, at −10° C., there is added 22.0 parts (0.15 mole) of 2-methyl-1,2,3,4-tetrahydroisoquinoline and the mixture stirred one hour. t-Butyl alcohol (30 parts) is added over a 10–15 minute period and the mixture stirred an additional two hours followed by the addition of 24 parts methanol. The ammonia is allowed to evaporate and the residue diluted with water and extracted with benzene. The benzene extract is distilled to give 22 parts (99% of the theory) of 2-methyl-1,2,3,4,5,8-hexahydroisoquinoline, b.p. 72–73° C. (3 mm.).

EXAMPLE 3

Preparation of 2-methyl-1,2,3,4,5,6,7,8-octahydroisoquinoline

A pressure reactor is charged with 1.3 parts of 10% palladium on carbon, 60 parts of ethyl acetate and 22.4 parts (0.15 mole) of 2-methyl - 1,2,3,4,5,8 - hexahydroisoquinoline. The system is pressurized to 50 p.s.i.g. with hydrogen and the reaction permitted to proceed until hydrogen uptake ceases. The catalyst is removed by filtration and the filtrate distilled to give 22.6 parts (100% of the theory) of 2-methyl - 1,2,3,4,5,6,7,8 - octahydroisoquinoline, b.p. 104–106° C. (10 mm.).

EXAMPLE 4

Preparation of 2-(p-methoxybenzyl)-2-methyl-1,2,3,4,5,6,7,8-octahydroisoquinolinium chloride A mixture of 15.1 parts (0.1 mole) of 2-methyl-1,2,3,4,5,6,7,8-octahydroisoquinoline, 18 parts (0.115 mole) of p-methoxybenzyl chloride and 87 parts xylene is heated in a nitrogen atmosphere to 60° C. and aged at this temperature for 8–10 hours. The resulting slurry is cooled to 25° C. and filtered to give 29.5 parts (96% of the theory) of 2 - (p - methoxybenzyl) - 2 - methyl - 1,2,3,4,5,6,7,8-octahydroisoquinolinium chloride, m.p. 189–190° C.

The same procedure can be used to prepare 2-(p-methoxybenzyl) - 2 - methyl - 1,2,3,4 - tetrahydroisoquinolinium chloride and 2-(p-methoxybenzyl) - 2 - methyl-1,2,3,4,5,8-hexahydroisoquinolinium chloride.

EXAMPLE 5

Preparation of 1-(p-methoxybenzyl)-2-methyl-1,2,3,4,5,6,7,8-octahydroisoquinoline To a refluxing solution (140° C.) of 68.2 parts (0.62 mole) of sodium t-amylate and 680 parts of xylene, under nitrogen there is added portionwise over a 20–30 minute period, 154 parts (0.50 mole) of 2-(p-methoxybenzyl)-2-methyl - 1,2,3,4,5,6,7,8 - octahydroisoquinolinium chloride. As the reaction proceeds the tertiary amyl alcohol which is formed is removed by distillation. The rate of addition of the quaternary salt is regulated so that the temperature of the reaction mixture is maintained between 138° and 140° C. After complete addition the mixture is refluxed for one hour, then cooled and quenched with water and extracted with dilute phosphoric acid. The acid extract is made strongly basic with caustic and extracted with hexane. The hexane extracts contain an amount of 1-(p-methoxybenzyl) - 2 - methyl-1,2,3,4,5,6,7,8-octa-hydroisoquinoline, as shown by gas liquid chromatography, equivalent to a 53% yield and an amount of 2-[N-methyl-N-(p - methoxybenzyl)aminomethyl] - vinylcyclohexene equivalent to a 10% yield. The 1-(p-methoxybenzyl)-2-methyl - 1,2,3,4,5,6,7,8 - octahydroisoquinoline can be isolated (42% yield) as its oxalate salt, m.p. 163–164° C.

EXAMPLE 6

Preparation of 1-(p-methoxybenzyl)-2-methyl-1,2,3,4,5,6,7,8-octahydroisoquinoline To a refluxing slurry (under a nitrogen atmosphere) of 154 parts (0.50 mole) of 2-(p-methoxybenzyl) - 2 - methyl - 1,2,3,4,5,6,7,8 - octahydroisoquinolinium chloride in 435 parts of dry xylene is added, over a 25 minute period, a solution of 0.62 mole of sodium t-amylate in 435 parts of xylene. As the reaction proceeds the tertiary amyl alcohol which is formed is removed by distillation. The rate of addition of the base is regulated so that the temperature of the reaction mixture is maintained between 138° and 140° C. After complete addition, the mixture is treated as described in Example 5. Gas liquid chromatographic analysis of the hexane extract establishes a 10% yield of 2-[N-methyl - N - (p-methoxybenzyl)-aminomethyl]-vinylcyclohexene and a 53% yield of 1-(p-methoxybenzyl) - 2 - methyl - 1,2,3,4,5,6,7,8 - octahydroisoquinoline. Treatment of the hexane residue with oxalic acid gives a 42% yield of 1-(p-methoxybenzyl)-2-methyl - 1,2,3,4,5,6,7,8 - octahydroisoquinoline oxalate, m.p., 163–164° C.

EXAMPLE 7

Preparation of 1-(p-methoxybenzyl)-2-methyl-1,2,3,4,5,6,7,8-octahydroisoquinoline The procedure of Example 5 is repeated substituting potassium t-butoxide for the sodium t-amylate. Based on gas liquid chromatographic analysis of the hexane residues the yield of 1-(p-methoxybenzyl) - 2 - methyl-1,2,3,4,5,6,7,8 - octahydroisoquinoline is 45%. Treatment of the hexane residue with oxalic acid gives a 40% yield of 1-(p-methoxybenzyl)-2-methyl - 1,2,3,4,5,6,7,8 - octahydroisoquinoline oxalate.

EXAMPLE 8

Preparation of 1-(p-methoxybenzyl)-2-methyl-1,2,3,4,5,6,7,8-octahydroisoquinoline To a mixture containing 3.4 parts (0.030 mole) of potassium t-butoxide and 27 parts of diethyl carbitol under a nitrogen atmosphere at 160° C. there is added 7.7 parts (0.025 mole) of 2-(p-methoxybenzyl)-2-methyl-1,2,3,4,5,6,7,8-octahydroisoquinolinium chloride. The mixture is kept at 150–160° C. for two hours, cooled and quenched with water. Based on gas liquid chromatographic analysis the yield of 1-(p-methoxybenzyl)-2-methyl-1,2,3,4,5,6,7,8-octahydroisoquinoline is 42%.

EXAMPLE 9

Preparation of 1-(p-methoxybenzyl)-2-methyl-1,2,3,4,5,6,7,8-octahydroisoquinoline The procedure of Example 5 is repeated using tetrahydrofuran as the solvent and the reaction is conducted at reflux temperature (66° C.). Based on gas liquid chromatographic analysis the yield of 1-(p-methoxybenzyl)-2-methyl-1,2,3,4,5,6,7,8-octahydroisoquinoline is 20%.

EXAMPLE 10

Preparation of 1-(p-methoxybenzyl)-2-methyl-1,2,3,4,5,6,7,8-octahydroisoquinoline To a refluxing mixture in a nitrogen atmosphere, containing 3.7 parts (0.057 mole) of powdered potassium hydroxide and 55 parts of toluene, there is added 15.4 parts (0.050 mole) of 2 - (p-methoxybenzyl)-2-methyl-1,2,3,4,5,6,7,8-octahydroisoquinolinium chloride. The mixture is refluxed for two hours while continuously removing the water formed via a Dean Stark trap. The mixture is cooled and extracted twice with 20 parts of water. Gas liquid chromatographic analysis of the toluene residue established a 27% yield of 1-(p-methoxybenzyl)-2-methyl-1,2,3,4,5,6,7,8-octahydroisoquinoline.

EXAMPLE 11

Preparation of 1-(p-methoxybenzyl)-2-methyl-1,2,3,4,5,6,7,8-octahydroisoquinoline The procedure of Example 10 is repeated except that xylene is substituted for toluene. Based on gas liquid chromatographic analysis the yield of 1-(p-methoxybenzyl)-2-methyl-1,2,3,4,5,6,7,8-octahydroisoquinoline is 32%.

EXAMPLE 12

Preparation of 1-(p-methoxybenzyl)-2-methyl-1,2,3,4,5,6,7,8-octahydroisoquinoline The procedure of Example 11 is repeated except that the reaction components are mixed at room temperature, then heated to reflux temperature and that temperature maintained until no more water would distill from the reaction mixture. The yield of 1-(p-methoxybenzyl)-2-methyl-1,2,3,4,5,6,7,8-octahydroisoquinoline is 6%.

EXAMPLE 13

Preparation of 1-(p-methoxybenzyl)-2-methyl-1,2,3,4,5,6,7,8-octahydroisoquinoline The procedure of Example 12 is repeated except that benzene is used instead of xylene as the solvent. The yield of 1 - (p-methoxybenzyl)-2-methyl-1,2,3,4,5,6,7,8-octahydroisoquinoline is 5%.

EXAMPLE 14

Preparation of 1-(p-methoxybenzyl)-2-methyl-1,2,3,4,5,6,7,8-octahydroisoquinoline A mixture containing 1.3 parts of 2-(p-methoxybenzyl)-2-methyl - 1,2,3,4,5,6,7,8 - octahydroisoquinolinium chloride, 1 part of sodium tosylate and 7 parts of dimethylformamide is heated in a nitrogen atmosphere at 50–60° C. for 2 hours. The resulting solution of 2-(p-methoxybenzyl) - 2 - methyl - 1,2,3,4,5,6,7,8 - octahydroisoquinolinium tosylate is filtered to remove precipitated sodium chloride. The filtrate is added over a 30 minute period to a refluxing solution containing 1.1 parts of sodium t-amylate and 5 parts of dimethylformamide. As the reaction proceeds the t-amyl alcohol formed is removed by distillation. After complete addition the mixture is cooled, quenched with water, and extracted with hexane. The hexane extracts are shown by gas liquid chromatographic analysis to contain an amount of 1-(p-methoxybenzyl)-2-methyl-1,2,3,4,5,6,7,8-octahydroisoquinoline equivalent to a 30% yield. The product can be isolated (30% yield) as its oxalate salt, m.p. 163–164° C.

EXAMPLE 15

Preparation of 1-(p-methoxybenzyl)-2-methyl-1,2,3,4,5,6,7,8-octahydroisoquinoline A mixture containing 1 part of 2-methyl-1,2,3,4,5,6,7,8-octahydroisoquinoline, 1.1 parts of p-methoxybenzyl chloride and 10 parts of dimethylformamide is heated in a nitrogen atmosphere at 50–60° C. for 2 hours. To the resulting quaternary salt solution there is added 1.6 parts of sodium tosylate. The mixture is heated at 50–60° C. The resulting solution of 2-(p-methoxybenzyl)-2-methyl-1,2,3,4,5,6,7,8-octahydroisoquinolinium tosylate is filtered to remove precipitated sodium chloride. Potassium bicarbonate (1.4 parts) is added to the filtrate and the mixture is refluxed for four hours. The cooled reaction mixture is diluted with water and extracted with hexane. The hexane extract contains an amount of 1-(p-methoxybenzyl)-2-methyl-1,2,3,4,5,6,7,8 - octahydroisoquinoline equivalent to an 8% yield as determined by gas liquid chromatographic analysis.

EXAMPLE 16

Preparation of 1-(p-methoxybenzyl)-2-methyl-1,2,3,4,5,6,7,8-octahydroisoquinoline To a mixture of 6.6 parts (0.06 mole) of sodium t-amylate and 20 parts of hexamethylphosphoric triamide at 140° C. (nitrogen atmosphere) is added a warm (70–80° C.) slurry containing 7.7 parts (0.025 mole) of 2-(p-methoxybenzyl)-2-methyl - 1,2,3,4,5,6,7,8 - octahydroisoquinolinium chloride in 30 parts of hexamethylphosphoric triamide. The mixture is heated at 175° C. for one hour, cooled, quenched with water and extracted with hexane. Based on gas liquid chromatographic analysis of the hexane extracts the yield of 1-(p-methoxybenzyl)-2-methyl-1,2,3,4,5,6,7,8-octahydroisoquinoline is 38%.

EXAMPLE 17

Preparation of 1-(p-methoxybenzyl)-2-methyl-1,2,3,4,5,6,7,8-octahydroisoquinoline To a refluxing slurry of 7.64 parts (0.025 mole) of 2-(p-methoxybenzyl) - 2-methyl-1,2,3,4,5,8-hexahydroisoquinolinium chloride in 35 parts of xylene, under nitrogen, there is added 3.36 parts (0.030 mole) of potassium t-butoxide. The t-butanol is removed by distillation as it is formed. The mixture is refluxed for one hour, cooled and washed with water. The xylene residue containing the Stevens rearrangement product is evaporated under reduced pressure and the residue dissolved in 60 parts of isopropyl alcohol and hydrogenated using 0.1 part of platinum oxide as catalyst. Based on gas liquid chromatographic analysis the yield of 1 - (p-methoxybenzyl)-2-methyl-1,2,3,4,5,6,7,8-octahydroisoquinoline is 30%.

EXAMPLE 18

Preparation of 1-(p-methoxybenzyl)-2-methyl-1,2,3,4,5,6,7,8-octahydroisoquinoline A solution of 2 - (p-methoxybenzyl)-2-methyl-1,2,3,4,5,8-hexahydroisoquinolinium chloride is prepared by warming (50–60° C) for several hours under nitrogen a mixture containing 14.9 parts (0.10 mole) of 2-methyl-1,2,3,4,5,8-hexahydroisoquinoline, 15.7 parts (0.10 mole) of p-methoxybenzyl chloride and 100 parts of dimethylformamide. To to quaternary salt solution there is added 20 parts (0.18 mole) of potassium bicarbonate and the mixture is refluxed for 5 hours, cooled, diluted with water and extracted with hexane. The hexane is removed by evaporation at reduced pressure and the residue dissolved in isopropyl alcohol and hydrogenated using 0.1 part of platinum oxide as catalyst. Based on gas liquid chromatographic analysis the yield of 1 - (p-methoxybenzyl)-2-methyl-1,2,3,4,5,6,7,8-octahydroisoquinoline is 30%.

EXAMPLE 19

Preparation of 1-(p-methoxybenzyl)-2-methyl-1,2,3,4-tetrahydroisoquinoline

A slurry of 20 parts of potassium bicarbonate in 100 parts of dimethylformamide is heated in a nitrogen atmosphere at 140° C. while 30.3 parts (0.1 mole) 2-(p-methoxybenzyl - 2 - methyl - 1,2,3,4-tetrahydroisoquinolinium chloride is added. The mixture is refluxed for four hours. The solvent is removed in vacuo and the residue diluted with 200 parts of water and extracted with heptane. The heptane is removed in vacuo and the residue treated with aqueous oxalic acid to give 17 parts (46% of the theory) of 1-(p-methoxybenzyl)-2-methyl-1,2,3,4-tetrahydroisoquinoline oxalate, mp.p 190–191° C.

EXAMPLE 20

Preparation of 1-(p-methoxybenzyl)-2-methyl-1,2,3,4-tetrahydroisoquinoline

The procedure of Example 15 is repeated except for the substitution of 2-methyl-1,2,3,4-tetrahydroisoquinoline for the 2-methyl-1,2,3,4,5,6,7,8-octahydroisoquinoline. The hexane extracts are concentrated in vacuo and the residue treated with 7 parts of oxalic acid dihydrate in 75 parts of water. A 56% yield of 1-(p-methoxybenzyl)-2 - methyl - 1,2,3,4 - tetrahydroisoquinoline oxalate is obtained.

It will be seen that the overall process of preparing 1-substituted-2-alkyl polyhydroisoquinolines comprises alkylating isoquinoline to form 2-alkyl isoquinoline, converting said 2-alkyl isoquinoline to a 2-alkyl-1,2,3,4-tetrahydroisoquinoline by hydrogenation, converting said 2-alkyl-1,2,3,4-tetrahydroisoquinoline to a 2-alkyl-1,2,3,4,5,8-hexahydroisoquinoline by treatment with an alkali metal and ammonia, converting said 2-alkyl-1,2,3,4,5,8-hexahydroisoquinoline to a 2-alkyl-1,2,3,4,5,6,7,8-octahydroisoquinoline by hydrogenation, converting said 2-alkyl-1,2,3,4,5,6,7,8-octahydroisoquinoline to a 2-substituted-2-alkyl-1,2,3,4,5,6,7,8-octahydroisoquinoline salt by reaction with a para-substituted benzyl halide and conversion of said 2-substituted-2-alkyl-1,2,3,4,5,6,7,8-octahydroisoquinolinium salt to a 1-substituted-2-alkyl-1,2,3,4,5,6,7,8-octahydroisoquinoline by means of a Stevens rearrangement. The para-substitutent of the above para-substituted benzyl halide may be, as indicated, lower alkyl, lower alkoxy or hydrogen.

The sequence of reactions occurring in the above-overall process is illustrated as follows:

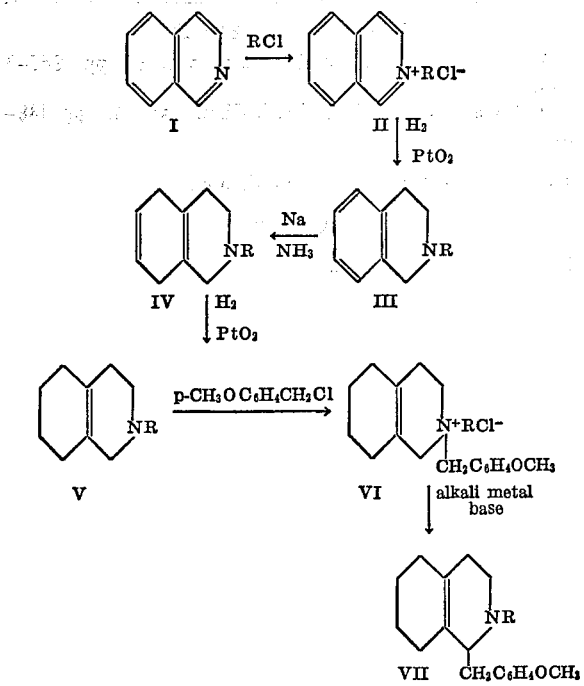

where R is lower alkyl.

The conversion of 2-alkyl-1,2,3,4-tetrahydroisoquinolines to 2 - alkyl - 1,2,3,4,5,8 - hexahydroisoquinolines by treatment with an alkali metal and ammonia is best carried out at a temperature within the range of from about —20° to about 0° C. This requires the use of a pressure vessel because ammonia boils at —34° C. At higher temperatures, i.e., above about 0° C. the reaction does not occur and below about —20° C. the cost of refrigeration becomes a significant disadvantage. As indicated, sodium is preferred as the alkali metal.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for the preparation of 1-substituted-2-alkyl polyhydroisoquinolines consisting essentially of reacting a substituted N-alkyl polyhydroisoquinolinium salt having the following formula:

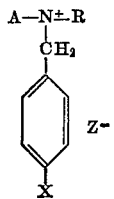

where R is methyl, A, taken with N, is an octahydroisoquinoline, hexahydroisoquinoline or tetrahydroisoquinoline residue, Z is a halide or tosylate ion, and X is lower alkyl, lower alkoxy or hydrogen, with an alkali metal hydroxide, alcoholate having up to 6 carbons; carbonate or bicarbonate, in an inert solvent, at a temperature of from about 130° C. to about 170° C.

2. A process for the preparation of 1-substituted -2-alkyl polyhydroisoquinolines consisting essentially of reacting a substituted N-alkyl polyhydroisoquinolinium halide having the following formula:

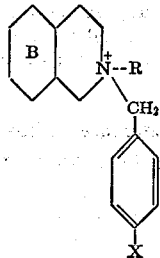

where R is methyl, the 6-membered ring B is tetrahydrobenzo, dihydrobenzo or benzo, Z is a halide ion, and X is lower alkyl, lower alkoxy, or hydrogen with a basic reactant which is an alkali metal hydroxide, alcoholate having up to 6 carbons, carbonate or bicarbonate, in an inert solvent, at a temperature of from about 130° C. to about 170° C.

3. The process of claim 2 wherein the 6-membered ring B is tetrahydrobenzo.

4. The process of claim 2 wherein X is lower alkoxy.

5. The process of claim 2 wherein X is methoxy.

6. The process of claim 2 wherein the alkali metal of the basic reactant is sodium.

7. The process of claim 2 wherein the alkali metal of the basic reactant is potassium.

8. The process of claim 2 wherein the basic reactant is a sodium alcoholate.

9. The process of claim 2 wherein the basic reactant is a potassium alcoholate.

10. A process for the preparation of 1-(p-methoxybenzyl)-2-methyl - 1,2,3,4,5,6,7,8 - octahydroisoquinoline consisting essentially of reacting 2-(p-methoxybenzyl)-2-methyl - 1,2,3,4,5,6,7,8 - octahydroisoquinolinium chloride with a basic reactant which is an alkali metal hydroxide, alcoholate having up to 6 carbons, carbonate or bicarbonate, in an inert solvent, at a temperature of from about 130° C. to about 170° C.

11. The process of claim 10 wherein the basic reactant is an alkali metal alcoholate.

12. The process of claim 10 wherein the basic reactant is a sodium alcoholate.

13. The process of claim 10 wherein the basic reactant is a potassium alcoholate.

14. A process for the preparation of 1-(p-methoxybenzyl) - 2 - methyl-1,2,3,4,5,6,7,8-octahydroisoquinoline consisting essentially of adding 2-(p-methoxybenzyl)-2-methyl - 1,2,3,4,5,6,7,8 - octahydroisoquinolinium chloride to a heated mixture of a basic reactant which is an alkali metal hydroxide, alcoholate having up to 6 carbons, carbonate or bicarbonate and an inert solvent, said heated mixture being maintained at a temperature of from about 130° C. to about 170° C.

15. The process of claim 14 wherein the basic reactant is an alkali metal alcoholate.

16. The process of claim 14 wherein the basic reactant is sodium tert-amylate.

17. The process of claim 14 wherein the basic reactant is potassium tert-butoxide.

18. The process of claim 14 wherein the inert solvent is xylene.

19. A process for the preparation of 1-substituted-2-alkyl polyhydroisoquinolines comprising alkylating isoquinoline to form a 2-alkyl isoquinoline, separating said 2-alkyl isoquinoline and converting it to a 2-alkyl-1,2,3,4-tetrahydroisoquinoline by treatment with an alkali metal and ammonia, separating said 2-alkyl-1,2,3,4,5,8-hexahydroisoquinoline and converting it to a 2-alkyl-1,2,3,4,5,6,7,8 - octahydroisoquinoline by hydrogenation, separating said 2 - alkyl-1,2,3,4,5,6,7,8-octahydroisoquinolinium salt by reaction with a para-substituted benzyl halide, separating said 2-substituted-2-alkyl-1,2,3,4,5,6,7,8-octahydroisoquinolinium salt and converting it to a 1-substituted-2-alkyl-1,2,3,4,5,6,7,8-octahydroisoquinoline by reaction in an inert solvent with an alkail metal hydroxide, alcoholate having up to 6 carbons, carbonate or bicarbonate, said alkyl being lower alkyl.

References Cited

UNITED STATES PATENTS

| 2,789,111 | 4/1957 | Grewe | 260—289 R |
| 3,459,755 | 8/1969 | Mathison et al. | 260—289 R |
| 3,673,789 | 6/1972 | Curran | 260—289 R |
| 3,682,925 | 8/1972 | den Hollander | 260—289 R |
| 3,557,122 | 1/1971 | Shavel et al. | 260—289 R |

OTHER REFERENCES

Block et al.: Jour. Med. Chem., vol. 12, pp. 845–7 (1969).

Yokoyama et al.: Jour. Med. Chem., vol. 12, pp 488–92 (1970).

DONALD G. DAUS, Primary Examiner

U.S. Cl. X.R.

260—283 R, 285, 286 Q